United States Patent [19]

Ravndal

[11] Patent Number: 5,474,370
[45] Date of Patent: Dec. 12, 1995

[54] FRONT WHEEL PRESSURE CONTROL WHEN VEHICLE STOPPING IS IMMINENT

[75] Inventor: Seth C. Ravndal, Osceola, Ind.

[73] Assignee: AlliedSignal Inc., Morristown, N.J.

[21] Appl. No.: 260,946

[22] Filed: Jun. 16, 1994

[51] Int. Cl.[6] ..................................... B60T 8/00
[52] U.S. Cl. ..................... 303/113.5; 303/119.1; 303/DIG. 4
[58] Field of Search ..................... 303/94, 95, 97, 303/99, 104, 105, 109, 113.5, 119.1, 119.2, 900, 9.71, DIG. 1–DIG. 4

[56] References Cited

U.S. PATENT DOCUMENTS

| | | | |
|---|---|---|---|
| 4,620,565 | 11/1986 | Brown | 303/119.2 X |
| 4,778,226 | 10/1988 | Brown | 303/116.1 |
| 4,991,910 | 2/1991 | Shimanuki et al. | 303/109 |
| 5,272,636 | 12/1993 | Buschmann et al. | 303/105 X |

FOREIGN PATENT DOCUMENTS 0031710  7/1981  European Pat. Off. ............. 303/105

*Primary Examiner*—Josie A. Ballato
*Attorney, Agent, or Firm*—Leo H. McCormick, Jr.; Larry J. Palguta

[57] ABSTRACT

A binary valve (40) for use in an anti-lock brake system having an electronic control unit (12) responsive to a wheel speed sensor (14) for optimizing the utilization of pressurized fluid to front (20,22) and rear (24,26) wheels during a brake application. The binary valve (40) is responsive to an input signal from the electronic control unit (12) derived by calculating when a complete stop (54) of a vehicle would occur and at approximately five seconds prior to such complete stop (54) decaying the fluid pressure supplied to the front (20,22) brakes to provide a transition (58) between the rate of deceleration (52) and a delayed complete stop location (56).

10 Claims, 2 Drawing Sheets

FRONT WHEEL PRESSURE CONTROL WHEN VEHICLE STOPPING IS IMMINENT

This invention relates to a binary solenoid valve arrangement which is responsive to an input signal from an electronic control unit to provide for a controlled decay of pressurized fluid supplied to the front wheel brakes of a vehicle to provide for a smooth transition between a brake deceleration rate and a complete stop.

BACKGROUND OF THE INVENTION

In brake systems equipped with anti-lock devices, an electronic control unit receives information from wheel speed sensors and modulates the fluid pressure that is supplied to the individual wheel brakes to prevent lock up or a skid between a wheel and a road surface. In such brake systems, the operation of the electronic control unit is in operation when the speed of the vehicle is below a predetermined value. Unfortunately, during certain brake operations when uniform deceleration occurs from a relatively high speed to a complete stop the vehicle can experience jerk or a pitch rate wherein the front of the vehicle rotates toward the road surface. In addition to causing discomfort to the driver and passenger of the vehicle, such sudden stops can affect suspension of the vehicle.

SUMMARY OF THE INVENTION

The present invention is designed to increase driver comfort by reducing the dynamic characteristics such as jerk, pitch and dipping that can occur at the end of a brake application while at the same time not adversely effecting a desired deceleration rate as requested by a driver to effect such a brake application.

The invention is part of a brake system which includes an anti-lock brake system having at least one wheel speed sensor that communicates information with respect to the speed of a vehicle to an electronic control unit. A binary solenoid valve which connected to a source of pressurized fluid and electronic control unit allows pressurized fluid to freely flow to the front wheel brakes during a normal brake application. During a brake application, the electronic control unit acts on the information supplied by the speed sensor and determines the time at which a complete stop would occur as a function of the current rate of deceleration. When it is determined that a complete stop will occur in less than five seconds, the electronic control unit supplies the binary solenoid valve with an operational signal to terminate communication between the source of pressurizing fluid and the front brake and initiates communication between the front wheel brake and a storage container to allow the fluid pressure to decay and reduce the fluid pressure of the pressurized fluid supplied to the front brake to provide a smooth transition between the deceleration and the complete stop.

DETAILED DESCRIPTION OF THE INVENTION

Figure 1:
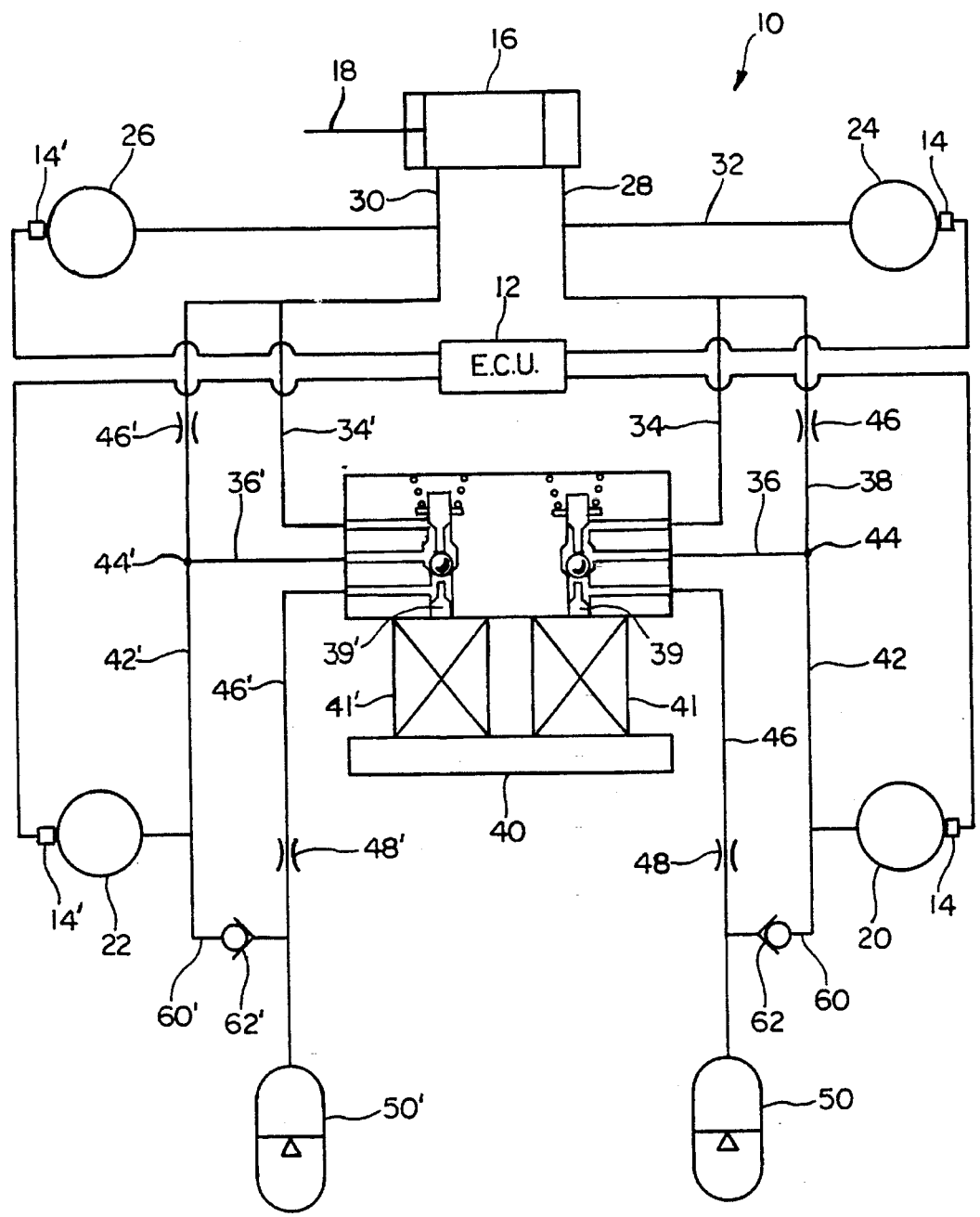
FIG. 1 is a schematic representation of a brake system for a vehicle incorporating the present invention in an anti-lock system wherein pressurized fluid from a source is supplied to the wheel brakes to affect a brake application.

The brake system 10 shown in FIG. 1 includes an anti-lock system having an electronic control unit 12 which receives information from wheel speed sensors 14 associated with brake circuit and wheel speed sensors 14' associated with brake circuit 30. The anti-lock system is of a type which is disclosed in U.S. Pat. No. 4,778,226 and only those portions that interact with the present invention are shown in detail in FIG. 1. The source of pressurized fluid is shown as a master cylinder 16 which receives an input from an operator through linkage 18 to pressurize fluid and supply pressurized fluid to the front wheel brakes 20 and 22 and the rear wheel brakes 24 and 26 to effect a brake application. As shown in FIG. 1, right front wheel brake 20 and left rear wheel brake 24 are in the first circuit 28 and the left front wheel brake 22 and right rear wheel brake 26 are located in the second circuit 30.

The first and second brake circuits 28 and 30 are identical and only the components in the first brake circuit 28 will be described in detail however the components in the second brake circuit 30 will be identified in the drawings by the same number with a' added thereto.

The first brake circuit 28 has a conduit 32 through which pressurized fluid is directly supplied to rear wheel brake 24, a conduit 34 which connects master cylinder 16 to a binary solenoid valve 40. The binary solenoid 40 is of a type disclosed in U.S. Pat. No. 4,620,565 having a first position wherein fluid freely passes as shown in FIG. 1 and a second position wherein fluid flow is restricted. As shown in FIG. 1, conduit 36 connects solenoid valve 40 with a junction 44 of conduit 42 connected to the front wheel brake 20. A conduit 38 also connects circuit 28 with junction 44 however a restrictive orifice 46 is sized such that flow through solenoid valve 40 normally occurs to supply the front wheel brake 20 with pressurized fluid to effect a brake application. During a brake application, wheel speed sensors 14 continually provide the electronic control unit 12 with information relating to the speed of a vehicle. The electronic control unit 12 in addition to controlling the anti-lock function for the individual wheel brakes also determines from the rate of deceleration the time for a vehicle to come to a complete stop.

Through experimentation it has been determined that a time period of less that five seconds and preferable about one second is sufficient to provide for a smooth transition between deceleration and a complete stop for driver comfort. Thus, when the electronic control unit 12 determines that only the selected time remains before the vehicle comes to a complete stop, the electronic control unit 12 supplies binary valve 40 with an operational signal which actives the coil 41 therein and moves a plunger from a first position to a second position as shown in FIG. 2 to terminate communication of pressurized fluid from the master cylinder 16 through conduit 34 and initiate communication of pressurized fluid from front wheel brake 20 to a storage container or accumulator 50 by way of conduit 42, conduit 36 and conduit 46, Conduit 46 includes a orifice 48 which offers some restriction to the communication of pressurized fluid to accumulator and thereby provide for a smooth reduction in the level of the pressurized fluid.

Figure 3:
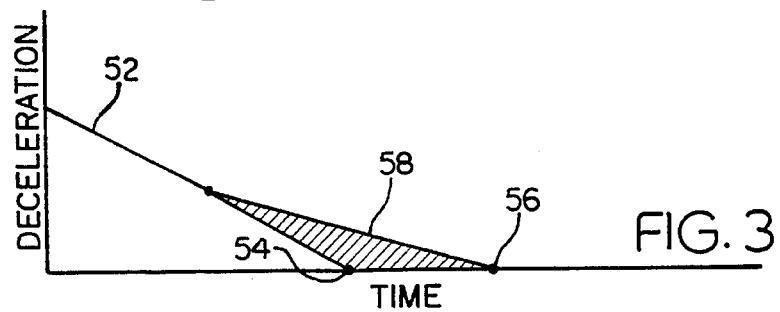
FIG. 3 is a graph illustrating the transition between the rate of deceleration and a complete stop for the vehicle as provided by the functional operation of the structural components of FIG. 2.

FIG. 3 is a graphic illustration of the transition between the rate of deceleration as illustrated by line 52 and the point 54. When the fluid pressure applied to the front wheel brake 20 has been reduced by communication to the accumulator 50 the time to come to a complete stop is increased to point 56 however the slope of deceleration rate is changed as illustrated by line 58 to provide for a smooth transition.

Figure 2:
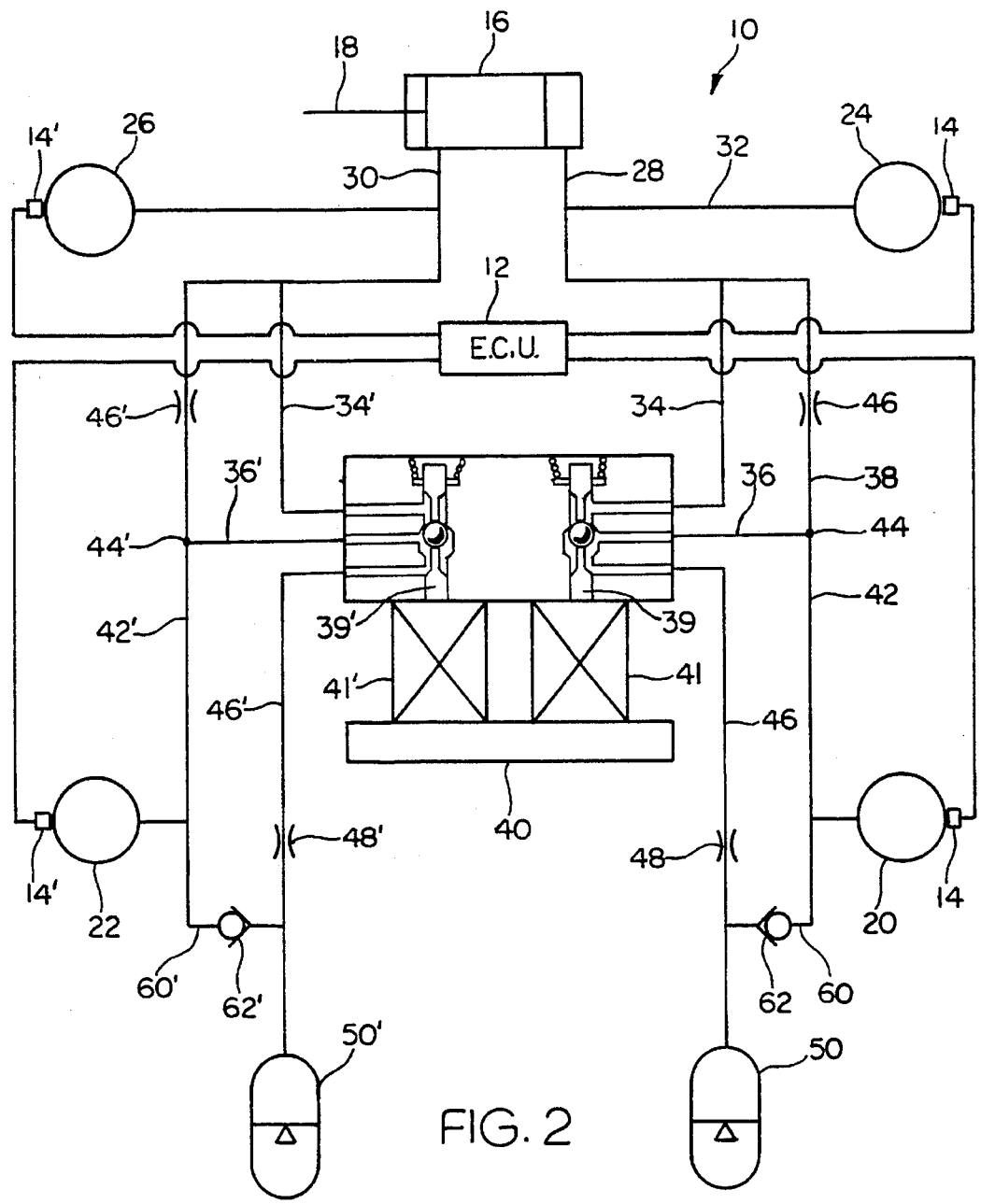
FIG. 2 is a schematic representation of the brake system of FIG. 1 wherein a binary solenoid valve is actuated to allow for decay in the pressurized fluid supplied to the front brakes prior to the vehicle coming to a complete stop.

When solenoid valve 40 is actuated as shown in FIG. 2, the fluid pressure of the fluid in conduit 38 is also lowered and as a result some flow occurs from circuit 28 through bypass orifice 46 to replenish some of the fluid that is communicated to accumulator 50. At the same time, as a result of the fluid flow from circuit 28 at this time, the fluid pressure that is supplied to the left rear wheel brake 24 is also slightly reduced to aid in smooth brake action at the end of the brake application.

When the vehicle comes to a complete stop, the signal from the electronic control unit 12 to the binary solenoid valve 40 terminates and the flow communication is returned to that illustrated in FIG. 1 with conduit 34 connected to junction 44. With the plunger of binary valve 44 in the first position, communication through conduit 46 from accumulator 50 is also terminated however conduit 60 with its one way check valve 62 allows pressurized fluid to flow to the master cylinder 16 by way of conduits 42, 36 and 34.

The functional operation of the wheel brakes in circuit 30 are identical to the operation of the wheel brakes in circuit 28 and together provide for the braking of the vehicle.

In some applications it may be desirable to have the binary solenoid valve connected to the rear wheel brakes to reduce the fluid pressure supplied during a brake application and develop the smooth transition at the end of a brake application. It is anticipated that this type of application could be advantageous in instances where the front and rear brake circuits are joined together rather than the cross split as illustrated in FIGS. 1 and 2.

I claim:

1. In an anti-lock brake system having at least one wheel speed sensor that communicates information relative to the speed of a vehicle to an electronic control unit to optimize the communication of pressurized fluid from a source of pressurized fluid to front and rear wheel brakes of a vehicle to effect a brake application, the invention comprising;

valve means connected to said source of pressurized fluid and electronic control unit for interrupting communication to said front wheel brakes when the vehicle speed as determined by a current deceleration of the vehicle indicates a complete stop would occur in less than five seconds and initiating communication between said front wheel brakes and a storage container to reduce the fluid pressure of the pressurized fluid supplied to said front brakes and provide a smooth transition deceleration and the complete stop.

2. In an anti-lock brake system having a first circuit connecting a first front wheel brake and a first rear wheel brake with a source of pressurized fluid and a second circuit connecting a second front wheel brake and a second rear wheel brake with said source of pressurized fluid, a wheel speed sensor for detecting a wheel speed of a vehicle, and an electronic control unit responsive to said wheel speed sensor for optimizing the communication of pressurized fluid to said first and second front wheel brakes and first and second rear wheel brakes to effect a brake application, the invention comprising:

valve means connected to first and second circuits and said electronic control unit for interrupting communication of pressurized fluid to said first and second front wheel brakes when a deceleration of the vehicle indicates a complete stop would occur in less than five seconds and for initiating communication between said first and second front wheel brakes and a storage container to reduce the fluid pressure supplied to said first and second front wheel brakes and provide a smooth transition between the deceleration and complete stop.

3. In the brake system as recited in claim 2 wherein said valve means includes;

a first binary solenoid valve connected to said first circuit and said first front wheel brake, said first binary solenoid valve having a first position where pressurized fluid is freely communicated from said source to said first front wheel brake and a second position where communication of pressurized from said source is terminated and communication from said first front wheel brake to said storage container is initiated.

4. In the brake system as recited in claim 3 wherein said valve means includes;

a second binary solenoid valve connected to said second circuit and said second front wheel brake, said second binary solenoid valve having a first position where pressurized fluid is freely communicated from said source to said second front wheel brake and a second position where communication of pressurized from said source is terminated and communication from said second front wheel brake to said storage container is initiated.

5. In the brake system as recited in claim 4 further including:

a second bypass conduit that connects said second circuit directly to said second front wheel brake; and a second orifice in said second bypass conduit to restrict the flow of said pressurized fluid from said source of pressurized fluid to said second front wheel brake such that when said second binary solenoid valve is in the first position pressurized fluid flows through the second binary solenoid valve to the second front wheel brake and when said second binary solenoid valve is in the second position pressurized fluid flows through said second restriction to reduce the fluid pressure to the second rear wheel brake and contribute to said smooth transition between said deceleration and complete stop.

6. In the brake system as recited in claim 5 further including:

a fourth orifice located in a fourth conduit that connects said second binary solenoid valve with said storage container, said fourth orifice restricting the flow of pressurized fluid from said second front wheel brake to said storage container to control the flow of pressurized fluid when said second binary solenoid valve is in said second position.

7. In the brake system as recited in claim 6 further including:

a second check valve through which said storage container is connected to said master cylinder to allow pressurized fluid to flow to said second circuit on termination of communication of pressurized fluid from said source.

8. In the brake system as recited in claim 3 further including:

a first bypass conduit that connects said first circuit directly to said first front wheel brake; and a first orifice in said first bypass conduit to restrict the flow of said pressurized fluid from said source of pressurized fluid to said first front wheel brake such that when said first binary solenoid valve is in the first position pressurized fluid flows through the first binary solenoid valve to the first front wheel brake and when said first binary solenoid valve is in the second position pressurized fluid flows through said first restriction to reduce the fluid pressure to the first rear wheel brake and contribute to said smooth transition between said deceleration and complete stop.

9. In the brake system as recited in claim 8 further including:

a third orifice located in a third conduit that connects said first binary solenoid valve with said storage container, said third orifice restricting the flow of pressurized fluid from said first front wheel brake to said storage container to control the flow of pressurized fluid when said first binary solenoid valve is in said second position.

10. In the brake system as recited in claim 9 further including:

a first check valve through which said storage container is connected to said master cylinder to allow pressurized fluid to flow to said first circuit on termination of communication of pressurized fluid from said source.

\* \* \* \* \*